United States Patent [19]

Soeder et al.

[11] Patent Number: 4,793,930

[45] Date of Patent: Dec. 27, 1988

[54] PROCESS FOR WASTE WATER PURIFICATION EMPLOYING THE ACTIVATED SLUDGE PROCESS

[75] Inventors: Carl J. Soeder, Dortmund; Heinrich Keusen, Jülich; Erich Zanders, Elsdorf; Franz Hofmeister, Rheine, all of Fed. Rep. of Germany

[73] Assignee: Kernforschungsanlage Julich Gesellschaft mit beschrankter Haftung, Julich, Fed. Rep. of Germany

[21] Appl. No.: 837,082

[22] Filed: Mar. 6, 1986

[30] Foreign Application Priority Data

Mar. 7, 1985 [DE] Fed. Rep. of Germany ....... 3508126

[51] Int. Cl.$^4$ ................................................. C02F 3/12
[52] U.S. Cl. ..................................... 210/614; 210/626; 210/903; 210/906
[58] Field of Search ............... 210/614, 623, 626, 629, 210/739, 96.1, 903, 906

[56] References Cited

U.S. PATENT DOCUMENTS 4,303,527 12/1981 Reimann et al. ..................... 210/614
4,437,992 3/1984 Saito et al. ........................ 210/614 X
4,504,393 3/1985 Davies ................................ 210/614

FOREIGN PATENT DOCUMENTS 321833 4/1975 Austria .

OTHER PUBLICATIONS

"The Oxidation of Sewage Without the Aid of Filters. Part II.", E. Ardern, J. Soc. Chem. Ind. 33 (1914) pp. 1122–1124.
"Nitrification on the Sequenching Batch Biological Reactor", Alleman, J. Water Pollut. Control Fed. 51 (1980) pp. 2747–2754.
"Continuous Intermittent Wastewater Systems for Municipal and Industrial Effluents", Publ. Health Eng. 8 (1980) 20.
"Treatment of a High-Strength Industrial Waste in a Continuously Fed, Intermittently Operated, Activated Sludge System", B. A. Bell, J. Water Pollut. Control Fed. 56 (1984) pp. 1160–1164.
"Relation Between Substrate Feeding Pattern and Development of Filamentous Bacteria in Activated Sludge Processes" E. Van den Eynde, Europ. J. Appl. Microbiol. Biotechno. 15 (1982) pp. 246–251.

*Primary Examiner*—Tom Wyse
*Attorney, Agent, or Firm*—Nils H. Ljungman

[57] ABSTRACT

Waste water purification employing the activated sludge process with batch-wise waste water feed to the aeration tank. There is continuous aeration and water discharge from the tank. The process has a fixed dosing cycle based on historical values for the curve of the bacterial activity with the batch-wise waste water feed or a function of indicator values for this activity, specifically as a function of the oxygen concentration in the tank through an appropriate control, which briefly opens the waste water feed when, for example, an oxygen electrode indicates that an adjustable limit value has been exceeded. By means of such an oxygen electrode, an alarm signal can simultaneously be tripped if the high oxygen consumption expected after the admission of the waste water does not occur. The process is specifically useful for the treatment of waste waters which tend to form too much bulking sludge.

18 Claims, 5 Drawing Sheets

PROCESS FOR WASTE WATER PURIFICATION EMPLOYING THE ACTIVATED SLUDGE PROCESS

BACKGROUND OF THE INVENTION

1. Field of the Invention

The invention relates to a process for waste water purification employing the activated sludge process with a ventilated activation tank from which treated waste water is continuously discharged.

2. Description of the Prior Art

It is a customary and generally-recognized rule of the art that the continuous, but usually not constant, flow rate of the waste water which is introduced into the biological stage of a waste water treatment plant is not manipulated. The result is a continuous charging of the aeration tanks, and within limits which are set, for example, on top by the separation duct and/or rainwater overflow, the flow rate of the waste water into the aeration tanks is a direct function of the inflow rate. In the case of domestic or urban waste water, this results in the known daily cycle of flow rate and pollution load expressed as COD (=chemical oxygen demand) or $BOD_5$ (=biochemical oxygen demand after 5 days) concentration.

These daily cycles (or weekly cycles) of waste water load are generally reflected in fluctuations of treatment efficiency, that is, they lead to fluctuations of the COD and $BOD_5$ concentration in the effluent, which is also clearly reflected in the permissible COD discharge values in accordance with waste water discharge laws. Accordingly, for example, the permissible COD maximum is twice the standard value (=operational average).

This shows that, so far, it has clearly not been possible to achieve constant purification performance within relatively narrow limits. Therefore, it seems desirable to develop a process which achieves a uniform discharge and guarantees a more effective protection of the water resources.

An additional problem in waste water treatment technology employing the activated sludge process is the uncontrolled formation of bulking sludge which is difficult to eliminate, especially with unfavorable C:N:P ratios (ratio of Carbon:Nitrogen:Phosphor source).

Even in the very earliest publications concerning the activated sludge process, it is considered advantageous to introduce the waste water alternately into two or more aeration tanks, so that there is a batch-wise operation for each individual tank (J. Soc. Chem. Ind. 33 (1914) 112). This method of operation has recently been propagated once again as the sequential batch reactor process (J. Water Pollution Control Fed. 51 (1980) 2747). A variant of the process is the continuously-fed activation tank with intermittent aeration and emptying (Publ. Health Eng. 8 (1980) 20; J. Water Pollution Control Fed. 56 (1984) 1160). Particular advantages of the last-named process are good elimination rates when the waste water concentration and quantities fluctuate widely, and high dentrification rates.

According to another aerobic waste water purification method, such as in Austrian Pat. No. 32 18 33, the waste water is treated in batches under increased air pressure in activated sludge tanks with a sudden pressure release after the completion of the biological treatment, by means of which a certain sludge densification is achieved.

In laboratory tests with mixed pure bacterial cultures, Van den Eynde, et al. (European J. Appl. Microbiol. Biotechnol. 15 (1982) 246) achieved an elimination of the filamentous bulking sludge bacteria by the desired flocculants by means of intermittent substrate supply. However, the transition from laboratory findings with pure cultures to industrial waste water purification is not without its difficulties.

OBJECT OF THE INVENTION

It is therefore an object of the invention to develop a process by means of which, even with waste waters with unfavorable C:N:P ratios, the tendency to the formation of bulking sludge is suppressed, an a uniform treatment efficiency is achieved within narrowly defined limits independent of daily and weekly fluctuations of the waste matter content of the water.

SUMMARY OF THE INVENTION

The process developed by the present invention is characterized by the fact that the waste water is fed into the aeration tank in batches by opening the waste water inlet to the tank is opened briefly for the batch-wise feed of waste water when the bacterial activity in the tank drops below a specified level. More specifically, the invention provides a process for waste water purification in a system utilizing an activated sludge process with an aeration tank from which treated waste water is continuously discharged while the batch-wise feed is controlled by a measurable concentration value of a particular constituent of interest in the waste water in the aeration tank indicating a special decrease in the bacterial activity. This constituent of interest has a concentration which is known to change in a characteristic manner during a cycle of the intermittently fed activated sludge process being reflective of the bacterial activity within the aeration tank. A (first) value establishing an accepted parameter for the concentration of the constituent of interest in the continuously discharged treated water is established being characteristic for a special level of decreased bacterial activity set as a limit for the treatment cycle. The concentration of the constituent of interest within the waste water contained in the aeration tank is measured, and that measured concentration is compared against the established parameter. Finally, waste water is introduced into the aeration tank when the measured concentration of the constituent of interest equals the accepted (first) control value.

In some tests, namely with the conventional, continuous treatment of waste water in aeration tanks with an unfavorable C:N:P ratio, it was observed that the bulking sludge formation which occurs can be completely eliminated by a batch-wise dosing of the waste water feed. This was not possible with continuous feed of the same waste water to the aeration tanks, and increase in the C:N:P ratios in the bulking sludge forming waste water as generally recommended.

The batch-wise dosing is conducted so that the incoming waste water flow is interrupted for a certain period of time by an apparatus which functions as a valve. At the end of the treatment cycle or dosing cycle adjusted to the admitted limit of bacterial activity decrease, the valve, which can also be designed as an adjustable gate, is opened for a brief period of time and a batch of fresh waste water is admitted to the aeration tank. The next dosing cycle begins with the renewed interruption of the waste water inflow. Typical period lengths of the dosing cycle, for example, are 30 to 60 minutes. The average hydraulic load and the sludge reflux ratio with batch-wise dosing are the same as with the ordinary continuous charging of the aeration tank.

The periodicity of this recommended intermittent feed of waste water to the activated sludge tanks, especially with waste waters which tend to a severe formation of bulking sludge, can initially be set as desired, but it must, in each case, be adjusted to the current purification conditions.

It has also been determined that the process can be optimized by means of an automatic regulatory system, which specifically measures the oxygen concentration in the aeration tank as an indicator for the bacterial activity to control the inlet.

BRIEF DESCRIPTION OF THE DRAWINGS

The above, as well as other features and advantages of the present invention, can be more clearly appreciated through consideration of the detailed description of the invention in conjunction with the several drawings, in which.

DESCRIPTION OF THE PREFERRED EMBODIMENT

Figure 1:
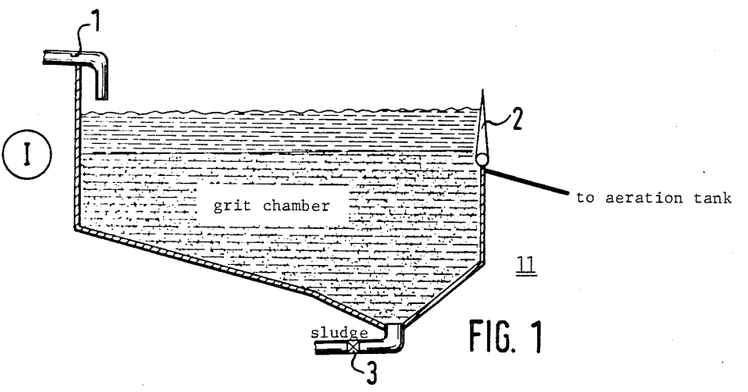
FIG. 1 is a schematical sectional elevational view of a grit chamber demonstrating the adjustable weir in closed position.
Figure 2:
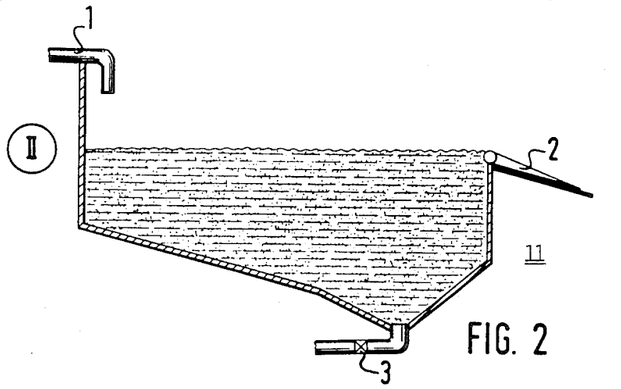
FIG. 2 is a schematical sectional elevational view of a grit chamber demonstrating the adjustable weir in opened position.
Figure 7:
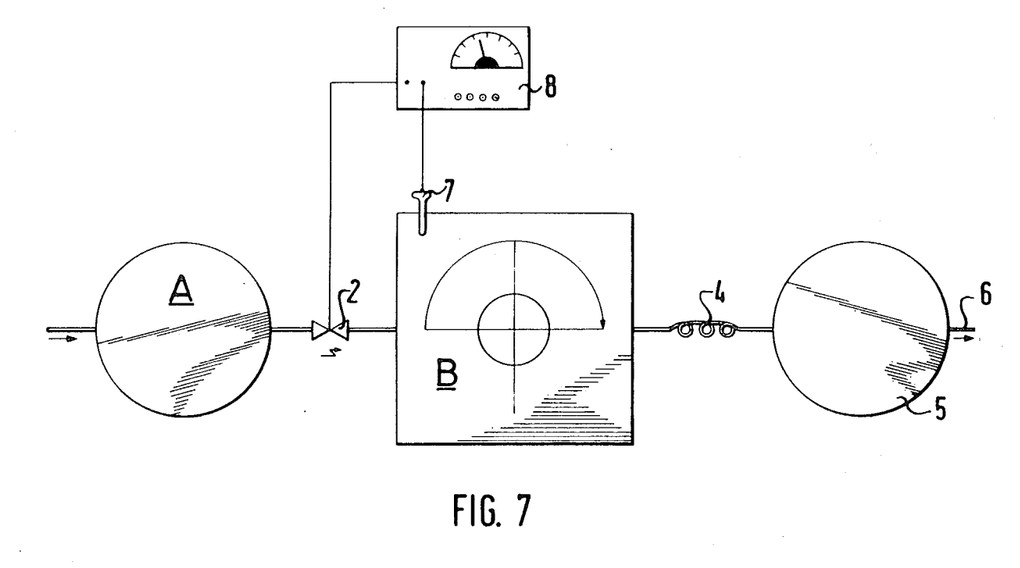
FIG. 7 shows a schematic diagram of an activated sludge plant regulated by the teachings of the present invention.

Both the process and apparatus of this invention can be generally appreciated through an initial consideration of FIGS. 1, 2 and 7. In FIG. 1, there is shown a grit chamber, or device in which waste water to be treated in an aeration tank is initially held. The chamber 11 includes a waste water inlet means 1 and an adjustable weir or valve means 2, by which waste water from the chamber 11 can be discharged therefrom for treatment in an aeration tank. As schematically represented in FIG. 7, an aeration tank 13 is fed through a batchwise process with waste water from the grit chamber or pre-sedimentation tank 11 via an element 2 which provides a valve-like function. As will be explained hereinafter, this valve-like function can be effected through a weir means which is hydraulically, pneumatically or otherwise remotely actuated through the control steps of this invention. The discharge of treated waste water from the aeration tank 13 is effected through a throttle means 4 which controls the discharge rate from the aeration tank 13 into a secondary sedimentation tank 5, from which it is finally discharged via line 6. The operation of the valve element 2 is governed by a regulatory control mechanism through the sensor means 7. The output of this sensor means 7 is conveyed to a control means 8, and the process of this invention can be effected according to the flow diagram illustrated in FIG. 4.

Figure 3:
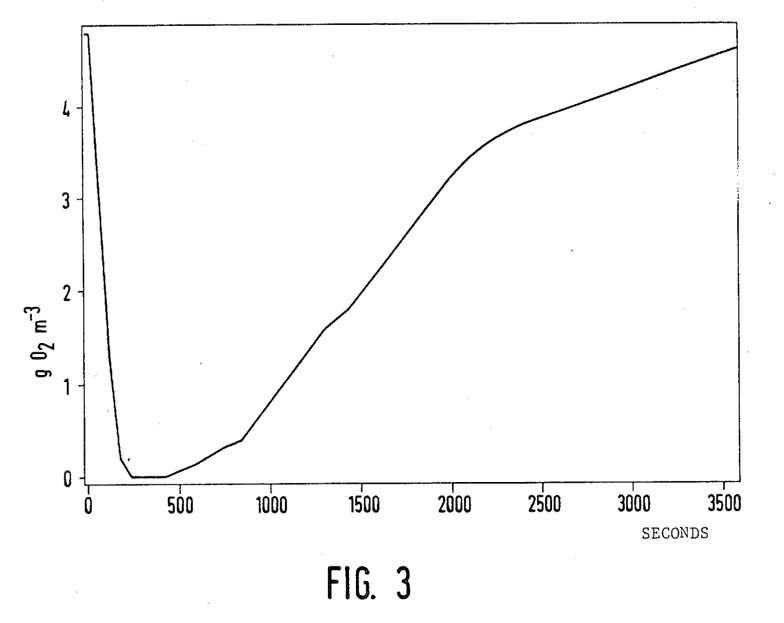
FIG. 3 is a graph illustrating an oxygen curve from an aeration tank during one cycle of intermittent waste water supply.

The process is based on the time course of bacterial activity (respiration rate) in an activated sludge tank subjected to a batch-wise feed of waste water, specifically as it is reflected in the changes of the oxygen concentration in the activated sludge tank throughout the dosing cycle, for example, as illustrated in FIG. 3.

If, at the end of a treatment or dosing cycle (e.g., with 120 seconds of feed per hour), fresh waste water (e.g., anaerobically treated sulfite, evaporator condensate from the pulp and paper industry) flows into the aeration tank, the concentration of the oxygen dissolved in it drops within a few minutes to a very low value near the limits of detection, in spite of continued and constant aeration. Depending on the concentration and volume of waste water added, some time passes, for example, 20 to 40 minutes, after the oxygen minimum is reached, until the dissolved oxygen again reaches values which would prevail with a continuous influx of waste water.

These periodic fluctuations of the oxygen concentration are now used by the invention to regulate the intermittent addition of waste water in a simple manner. For this purpose, the oxygen concentration is measured continuously, preferably in the lower region of the aeration tank, by means of an appropriate oxygen probe which is connected to a measurement transformer. Such oxygen detecting devices are commercially available and can be obtained from, for example, SYLAND, of Heppenheim, Federal Republic of Germany. These devices are apt to supply signals for controlling valves when predetermined values of oxygen concentration are reached.

Preferably, the measurement is compared by means of a microprocessor with the (first) adjusted value $W_1$ as specified above used to control the ordinary pulsed inflow operation of the installation and additionally with a second value $W_2$ used to release an alarm in the case of purification failure. At oxygen concentrations below the first command value, for example 3-4 mg $O_2/l$, the inlet to the aeration tank remains closed, and waste water is dammed up in the grit chamber or intermediate holding tank. When the first oxygen command value is exceeded, the inlet is opened for a preset time interval, preferably by means of a timer, for example, for three minutes (as in FIG. 4).

Figure 4:
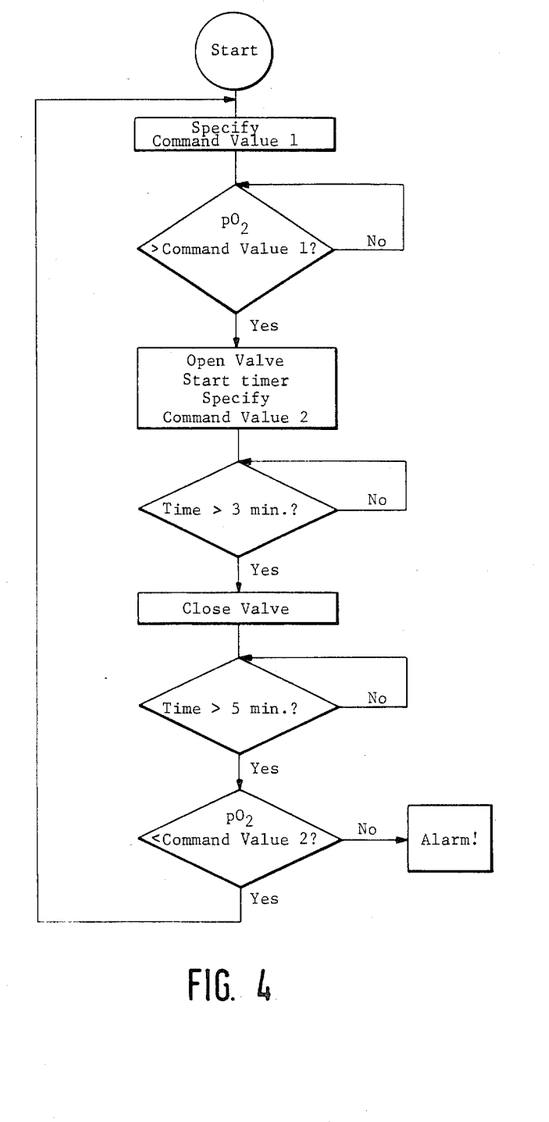
FIG. 4 is a control flow diagram for a batch-wise dosing process according to the teachings of the present invention.

At the same time, the microprocessor switches over to the second oxygen command value, for example, 0.5 mg/l. If the measurements do not drop below this second control value, for example, within five minutes after the opening of the inlet, then there is either a malfunction of the activated sludge or a dosing error, which trips an alarm signal. For example, 15 minutes after the opening of the inlet, the timer switches back to the first command value, and the regulation circuit is again in the starting status. As shown in FIG. 4, stable discharge values can be achieved independent of the waste content of the water and the temperature. According to experience so far, the residual COD in the discharge is somewhat lower (5–10%) than with continuous feeding of the aeration tank. In addition, a greater aeration efficiency is achieved at oxygen concentrations below the second control value. This results in a certain reduction of the specific energy requirement for aeration.

A further (lower) command value can also be used to trip switching processes, for example, to terminate the waste water influx into the aeration tank.

In the case of more severe daily and/or weekly fluctuations of the hydraulic load (Q), it is recommended that the hydraulic load of the aeration tank be made more uniform by the installation of a make-up tank or holding tank.

Analogous to the regulation of waste water dosing by means of the oxygen concentration described above, any other hydrochemical or physical-chemical parameters (pH, rH, $pCO_2$, concentration of acetate, methanol, etc.) which change to a sufficient extent and in a characteristic manner during a dosing cycle can be used as a control parameter.

The cycle time or indicator values and the feed quantity per cycle are governed by the pollutant concentration in the waste water to be treated, the specified volume load or sludge loading of the aeration tank, and the desired effluent quality, and have to be adjusted according to the actual requirements.

Generally, the fee volume per cycle is between 5% and 30%, specifically in the vicinity of between 10% and 20% of the volume of the aeration tank. But with low-load operation (at 0.2 kg COD/kg dry substance ·d), it can be less than 5%.

The appropriate cycle time is determined as a function of the biological activity of the sludge and can be determined empirically. In general, it is in the vicinity of 0.5 to 2 hours for treatment of moderately polluted waste water requiring nitrification.

The threshold values for the waste water admission ($W_1$) and the alarm trip ($W_2$) are also determined empirically. $W_1$ is at low-load operation, for example, and purification with nitrification in the vicinity of the oxygen saturation value of the curve (see FIG. 3) for the oxygen concentration in the aeration tank, i.e., in the range of 4-5 mg $O_2$/l, while $W_1$ at high-load operation and/or pre-sedimentation operation can be set at approximately 2 mg $O_2$/l or even less than that.

In relation to the oxygen saturation of the treated water, $W_1$ can specifically be between 5% and 90%, generally between 50% and 80%.

The alarm-trip threshold of $W_2$ is also taken in reference to continuous recordings of the oxygen concentration. It is above the (highest) oxygen minimum of the curve (see FIG. 3). $W_2$ is specifically adapted to the slope of the oxygen curve typical for the purification process after the termination of the waste water admission. If the oxygen measurement has not dropped below a specified value within the shortest possible length of time of a maximum 10 minutes (specifically 2 to 5 minutes), the alarm is tripped. This specified value is clearly above the typical value for the selected alarm time, specifically 0.5 to 2 mg/l above it.

If the composition and quantity of the waste water being treated are largely constant, the treatment or dosing cycle can be adjusted on the basis of optimized historic values, either by an electrical timer or by timed electrical relays. In this case, the dosing cycle has a constant period length.

The simplest arrangement of the batch-wise admission of waste water to an aeration tank is that, behind the grit chamber, there is an adjustable gate, whose operation is governed electromechanically, as shown in FIGS. 1 and 2. This apparatus is suitable above all for plants with a waste water inflow through inlet flow means 1 which is largely uniform.

In Phase I of the dosing cycle, the gate or valve means 2 is perpendicular and blocks the waste water flow from the aerated or not aerated grit chamber 11 into the aeration tank.

In Phase II, by means of an electrical pulse, the locking mechanism of the adjustable gate 2 is opened. It swings down, and the dammed-up waste water flows rapidly into the aeration tank.

In Phase III, the adjustable gate 2 is brought back to the vertical position by means of a drive motor.

The length of time when the waste water may inflow through the inflow means 1 may be the time when the adjustable gate 2 is open, and additionally, the time when the adjustable gate 2 is being brought back to a vertical position to cut off flow to the aeration tank. As can be seen above, this period of time would be the sum of the time of Phase II and the time of Phase III. As indicated infra, Phase II may have a time of 3 minutes and Phase III may have a time of 2 minutes. Therefore, if the time of Phase II and the time of Phase 3 are added, these two phases together will equal 5 minutes, which time is the time during which waste water may flow into the aeration tank.

The same purpose as an adjustable gate can be performed by an electromechanically-operated slide valve, which periodically opens and closes the discharge from the grit chamber via a channel or a tube, in response to the control signals from one of the regulatory circuits described by the invention. The sludge is removed via a line 3.

If, with a hydraulic retention time of the waste water of four hours and a sludge reflux ratio of, for example, 500% per day, the length of the dosing cycle is set at one hour, for example (Phase I: 55 minutes, Phase II: 3 minutes Phase III: 2 minutes), then after the dosing, in the aeration tank there is a fluid volume increase by 20%, or a correspondingly increased fill level. But to obtain a discharge into the secondary sedimentation tank which is as uniform as possbble, in spite of such a fluctuation in the level, the contents of the tank do not flow over an overflow edge into the collecting channel, but flow against a resistance of sufficient magnitude, for example, through crown-shaped relatively narrow pipes placed in the wall of the tank (for example, free width of 3-4 cm) into the collection channel, and from there into the final sedimentation tank.

In plants without a grit chamber, it is necessary to install a reservoir, the volume of which is, for example, 10% to 20% of the volume of the aeration tank. This continuously-fed, aerated or not aerated chamber is generally emptied by means of a slide or valve mechanism 2, as illustrated in FIG. 1. Only with constant waste water composition and flow rates can an automatic drainage of the reservoir be carried out by an overflow mechanism.

As illustrated in FIG. 7, the aeration tank 13 is fed intermittently with waste water from the primary sedimentation tank 11 via an element 2 with a valve function, while the discharge is continuous via a throttle 4 into a secondary sedimentation tank 5 with a discharge 6. The operation of the valve element 2 is governed by a regulatory mechanism through the probe or sensor means 7. The output of the probe 7 is conveyed to a program control means 8, and operates in the manner illustrated in the flow diagram of FIG. 4.

Embodiment:

In the purification of anaerobically treated sulfite evaporator condensate cellulose manufacture (COD approximately 10 kg m$^{-3}$) from biogas reactors (Aivasidis and Wandrey, Umschau Wissenschaftmagazine 84 (1984) 15), after dilution to 1:15, a COD purification degree of 90±3% was achieved. The aeration time was 24 hours, the oxygen concentration in the aeration tank 4.0±0.3 mg/l, the sludge reflux ratio approximately 750% d$^{-1}$ and the sludge load (B$_{TS}$)0.3–0.4 kg COD per kg dry weight.of activated sludge. The temperature was 22°±2° C. The treatment was seriously hindered after a few days by the massive formation of bulking sludge (SVI (sludge volume index) more than 1000 ml g$^{-1}$).

Figure 5:
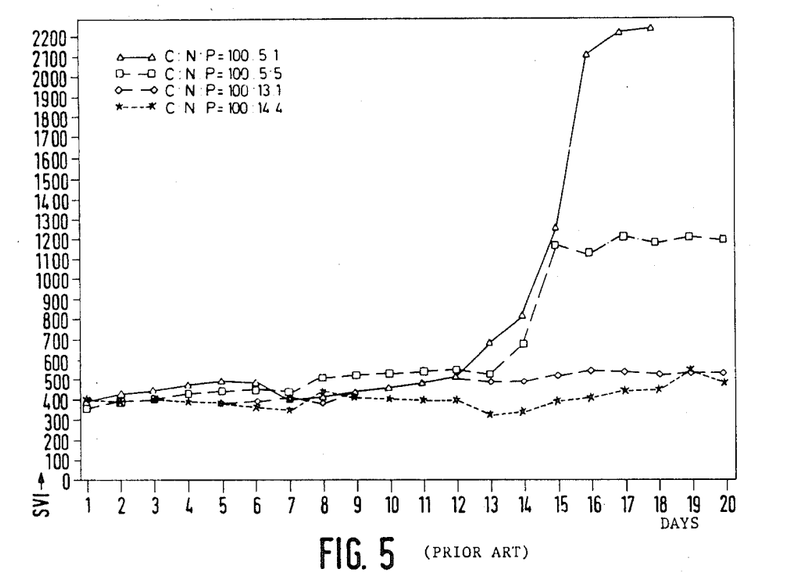
FIG. 5 illustrates a sludge volume index of aeration tanks with continuous feed of waste water which produces bulking sludge.

By increasing the original C:N:P ratio (100:5:1), as recommended to combat bulking sludge (Kapp, DFG Research Report KR 624/1, Institut für Siedlungswasserbau, Wassergüte und Abfallwirtschaft, Universität Stuttgart (1980)), the sludge volume index can, of course, be reduced to as low as 400 ml g$^{-1}$ (FIG. 5), but yet a satisfactoy sedimentation action cannot be achieved.

Figure 6:
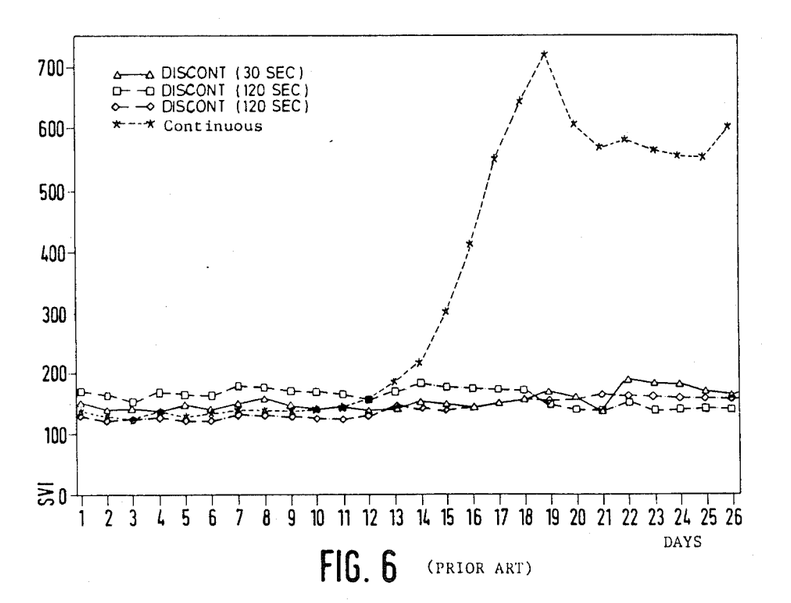
FIG. 6 shows a sludge volume index of aeration tanks with batch-wise or continuous supply of waste water which produces bulking sludge.

The dosing cycles were set with a timer to 30 to 120 sec h$^{-1}$, without changing the total throughput from what is was during continuous operation, which was maintained in a reference tank. As shown in FIG. 6, the batch-wise dosing of the waste water not modified by the addition of nutrients resulted in an acceptable sedimentation action. The efficiency (90±3%) in relation to COD elimination did not decrease. On the contrary, on the basis of the average of the measurements conducted so far, it increased by approximately 5%.

These results demonstrate the effectiveness of the batchwise addition of waste water to combat the formation of bulking sludge and to improve the efficiency of aerobic waste water treatment.

The preferred area of application for the batch-wise dosing of waste water is in industrial waste water treatment plants in which operation is—as known—disrupted by the formation of bulking sludge, such as in the treatment of waste waters from the food processing industry.

What has been described is a unique process and apparatus whereby waste water can be treated in a batch-wise process in an aeration tank from which tank treated waste water is continuously discharged. The batch-wise or dosed introduction of untreated waste water into the aeration tank is controlled by a measurement of a constituent of interest in the waste water held in the aeration tank.

The invention as described hereinabove in the context of a prefered embodiment is not to be taken as limited to all of the provided details thereof, since modifications and variations thereof may be made without departing from the spirit and scope of the invention.

What is claimed is:

1. A process for waste water purification in a system utilizing an activated sludge process to reduce sludge bluking, said process having an aeration tank, having a volume, from which treated waste water is continuously discharged, said process comprising the steps of:

identifying an oxygen related constituent of interest in the waste water in the aeration tank, which constituent has a concentration which is known to change in a characteristic manner during a cycle of the intermittently fed activated sludge process;

said oxygen related constituent being dissolved oxygen in the waste water in the aeration tank;

establishing a control value of said concentration of said dissolved oxygen in the waste water being treated in the aeration tank, said value being indicative for a requested purification stage of the treated waste water;

measuring said concentration of said dissolved oxygen in the waste water in the aeration tank;

comparing the measure concentration of said dissolved oxygen in the waste water in the aeration tank against the established control value; and intermittently introducing, in a cycle of from about one half hour to two hours, batches of waste water, having a volume, to be treated into the aeration tank only when said measured concentration of said dissolved oxygen in the waste water in the aeration tank equals said established control values wherein the intermittent introduction of batches of waste water to be treated occurs for a period of each cycle, of about one half hour to about two hours, of waste water purification as a function of the measured concentration and said determinable period of each cycle for introducing a batch of waste water is substantially shorter than its corresponding cycle of from about one half hours to two hours;

the volume of the batches of waste water being introduced into the aeration tank in each said cycle being in a range of from about 5% to about 30% of the volume of the aeration tank, whereby sludge bulking is reduced.

2. The process for waste water purification according to claim 1 wherein said measurement of said concentration of said constitunnt of interest is utilized as an alarm release when severe deviation occurs between said measurement and the experienced ordinary variation of said concentration immediately after said introduction of untreated waste water into the aeration tank.

3. The process for waste water purification according to claim 1 wherein said control value identifies an upper value of dissolved oxygen concentration, and wherein said untreated waste water is introduced into the aeration tank in a batch-wise technique when said oxygen concentration equals said control value.

4. The process for waste water purification according to claim 3 wherein said control value, identified as an upper value of dissolved oxygen concentration, is selected to be between about 5% to about 90% oxygen saturation in the aeration tank.

5. The process for waste water purification according to claim 3 including the steps of: establishing a curve reflective of dissolved oxygen concentration relative to an introduced volume of untreated waste water in the aeration tank; establishing the dissolved oxygen concentration value of the treated water in the aeration tank; comparing the established oxygen concentration value against the curve; and providing alarm means responsive to a resultant value from the step of comparing the established oxygen concentration values against the curve when said resultant value exceeds a predetermined maximum value.

6. The process for waste water purification according to claim 1 wherein the waste water introduced into the aeration tank has unfavorable Carbon:Nitrogen:Phosphor source ratios.

7. The process for waste water purification according to claim 1 wherein the waste water introduced into the aeration tank is obtained from the food processing industry, breweries and/or effluents from biogas reactors.

8. The process for waste water purification according to claim 1 wherein said determinable period comprises about 0.5 minutes to about 3 minutes.

9. A process for waste water purification in a system employing an activated sludge process to reduce sludge bulking, said process having an aeration tank, from which tank treated waste water is continuously discharged, comprising the steps of:
   feeding intermittently, in a cycle of from about one half hour to two hours, batches of waste water to be treated into the aeration tank which has a given volume;
   each of said batches being fed for an interval of less than about five minutes; and
   monitoring a measurable parameter of dissolved oxygen in the aeration tank indicative for the bacterial activity in the aeration tank, such that when said parameter indicates a drop of said activity below a specified value, a waste water inlet to the aeration tank is opened for the batch feeding of the waste water to be treated into the aeration tank from which treated waste water is continuously discharged;
   the volume of the batches of waste water being introduced into the aeration tank in each said cycle, of from about one half hour to two hours, being in a range of from about 5% to about 30% of the volume of the aeration tank, whereby sludge bulking is reduced.

10. The process for waste water purification according to claim 9 wherein the bacterial activity is monitored by measuring the dissolved oxygen concentration in the aeration tank, which dissolved oxygen concentration is an indication of the bacterial activity therein.

11. The process for waste water purification according to claim 10 wherein the waste water is fed into the aeration tank when the oxygen concentration in the aeration tank equals a specified value of between about 5% and about 90% of oxygen saturation.

12. The process for waste water purification according to claim 11 including the steps of: establishing a curve reflective of dissolved oxygen concentration relative to an introduced volume of water to be treated in the aeration tank; measuring the dissolved oxygen concentration value of the water in the aeration tank; comparing the measured dissolved oxygen concentration value against the curve; and providing alarm means responsive to a resulting value from the step of comparing the measured dissolved oxygen concentration value against the curve, when said resulting value exceeds a predetermined maximum value.

13. The process for waste water purification according to claim 9 wherein the waste water to be treated has an unfvvorable Carbon:Nitrogen:Phosphor source ratio.

14. The process for waste water purification according to claim 9 wherein a source of the waste water to be treated introduced into the aeration tank comes from at least one of the members of the group consisting of a food processing process, a brewery process, and a effluent from biogas reactors.

15. The process for waste water purification according to claim 9 wherein the continuously discharged treated waste water is conveyed downstream to secondary sedimentation tanks.

16. A process for waste water purification in a system utilizing an activated sludge process to reduce sludge bulking, said process having an aeration tank from which treated waste water is continuously discharged, said process comprising the steps of:
   identifying an oxygen related constituent of interest comprising dissolved oxygen in the waste water in the aeration tank, which constituent has a concentration which is known to change in a characteristic manner during a cycle of the intermittently fed activated sludge process;
   establishing a control value of said concentration of said constituent of interest in the waste water being treated in the aeration tank, said value being indicative for a requested purification stage of the treated waste water;
   measuring said concentration of said constituent of interest;
   comparing the measured concentration of said constituent of interest against the established control value; and
   intermittently introducing batches of waste water to be treated, for between about one half minute to about two minutes, in a cycle of from about one half hour to two hours, into the aeration tank only when said measured concentration of said constituent of interest equals said established control values wherein the intermittent introduction of batches of waste water to be treated represent a feed volume per cycle of up to approximately 30% of the aeration tank's volume, whereby sludge bulking is reduced.

17. The process for waste water purification according to claim 16 wherein the feed volume of the waste water to be treated per cycle is between about 10 to 20% of the aeration tank's volume.

18. A process for waste water purification in a system utilizing an activated sludge process to reduce sludge bulking, said process having an aeration tank, having a volume from which treated waste water is continuously discharged, said process comprising the steps of:
   establishing a control value for dissolved oxygen in the waste water being treated in the aeration tank, said value being indicative for a requested purification stage of the treated waste water;
   measuring dissolved oxygen in the aeration tank;
   comparing the measured concentration of said dissolved oxygen against the established control value; and
   intermittently introducing at from about one half hour to two hours, batches of waste water, having a volume, to be treated into the aeration tank only when said measured value of dissolved oxygen equals said established control values wherein the intermittent introduction of batches of waste water to be treated occurs for a period, of about 0.5 minutes to about 3 minutes of each cycle, of about one half hour to about two hours, of waste water purification as a function of the measured concentration and said period of each cycle;
   the volume of the batches of waste water being introduced into the aeration tank in each said cycle being in a range of from about 5% to about 30% of the volume of the aeration tank, whereby sludge bulking is reduced.

* * * * *